United States Patent [19]
Wonderland et al.

[11] 3,877,895
[45] Apr. 15, 1975

[54] METHOD AND APPARATUS FOR REMOVING WATER VAPOR FROM HIGH PRESSURE STEAM LINES

[75] Inventors: Harry J. Wonderland, Lakehurst, N.J.; Lawrence L. Guzick, Silver Spring, Md.

[73] Assignee: Flexitallic Gasket Company, Inc., Camden, N.J.

[22] Filed: Mar. 23, 1972

[21] Appl. No.: 237,328

[52] U.S. Cl. .................. 55/97; 55/466; 55/487; 55/502; 138/41; 138/44; 210/447
[51] Int. Cl. ............................................ B01d 46/00
[58] Field of Search ................... 210/97, 445–452; 55/502, 466, 485–487; 138/40, 41, 44

[56] References Cited
UNITED STATES PATENTS

| | | | |
|---|---|---|---|
| 2,068,858 | 1/1937 | Jones | 55/502 |
| 2,593,198 | 4/1952 | Rutherford | 210/499 |
| 3,622,008 | 11/1971 | Mucci et al. | 210/445 |
| 3,715,870 | 2/1973 | Guzick | 55/502 |

*Primary Examiner*—Bernard Nozick
*Attorney, Agent, or Firm*—Synnestvedt & Lechner

[57] ABSTRACT

An assembly comprising an orifice plate having a restriction designed to provide a substantial pressure drop in a steam line is disclosed. A first compressible spiral wound gasket consisting of alternate layers of asbestos and metal strip is mounted between the orifice plate and the end of the pipe on the downstream side of the plate. A second spiral wound gasket comprising alternate layers of asbestos and metal strip provides a seal between the high pressure side of the orifice plate and the end of the adjacent pipe. A screen having a multiplicity of openings dimensioned to permit the flow of particulates smaller than the size of the orifice is mounted on the high pressure side of the orifice. The screen is securely gripped in the inner periphery of the gasket. A second screen having a mesh larger than the first screen is mounted intermediate the first screen and the orifice thereby preventing axial movement of the first screen against the orifice plate.

7 Claims, 4 Drawing Figures

METHOD AND APPARATUS FOR REMOVING WATER VAPOR FROM HIGH PRESSURE STEAM LINES

BACKGROUND OF THE INVENTION

This invention relates to an assembly for the removal of condensate from high pressure steam lines and the like.

The removal of condensate from high pressure steam lines or other pressurized lines found in ships, power plants and various industrial installations where a supply of steam or other gas under relatively high pressure is piped from one location to another is a troublesome problem which has received considerable attention in the past. Typically the devices in use today comprise valves operating in response to the movement of a bimetal element or in some cases a float mounted for movement to operate a valve when liquid level in a float chamber reaches a predetermined point. Such arrangments are prone to failure chiefly because all piping systems contain many foreign particles. Rust and metal chips from threaded joints are only two examples of many particulates that are present to some degree. Systems involving mechanical links or levers are especially prone to cause trouble at high temperatures and pressures. Lubrication of movable elements in such systems is impossible. Any such system involving movable parts is subject to malfunction because the foreign particles may cause fouling and sticking of the mechanism. Moreover the hostile environment in which such mechanisms must exist, involving pressures of up to 1,500 psi or temperatures of 1,000°F makes any such system extremely prone to failure.

Efforts to avoid the difficulties mentioned have led to rather large traps which are quite expensive, a typical trap in a high pressure steam line in a ship costing in excess of $100. The total expense for a large ship is an appreciable item when it is considered that such a ship can have as many as 200 steam traps positioned in various steam lines.

With the foregoing in view, it is an object of this invention to provide an improved and simplified device for removing condensate from steam lines or the like.

A further object of the invention is to provide a simplified form of condensate removing apparatus which is highly reliable in operation.

A still further object of the invention is the provision of a condensate removing apparatus, which when used in place of conventional steam traps results in substantial reduction of maintenance and replacement costs.

A still further object of the invention is the provision of means for removing condensate from steam lines which is smaller and more compact than existing steam traps.

The foregoing and various other objects of the invention are achieved by an assembly including a plate adapted to be mounted in a steam line or the like, wherein the plate has an orifice located therein which provides a substantial pressure drop in the line. A first compressible gasket is mounted on the downstream side of the plate to provide a pressure seal between the orifice plate and the downstream pipe section. A second gasket is mounted on the upstream side of the plate providing a pressure seal between the adjacent side of the orifice plate and the upstream pipe section. A filter screen is carried by the second gasket thereby filtering out particles in the gas before they reach the orifice plate. The openings in the screen are sized to admit only particles small enough to pass through the orifice.

How the foregoing and other objects of the invention are achieved will be apparent upon reference to the detailed description of the illustrative embodiment of the invention and the accompanying drawing in which.

Figure 1:
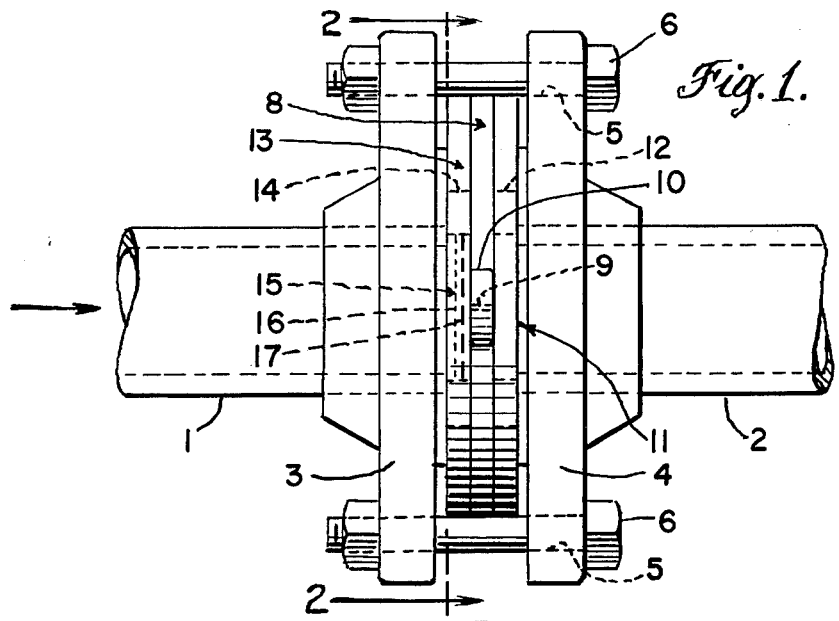
FIG. 1 is an elevational view showing an assembly formed according to the teachings of the invention.

Referring first to FIG. 1, a pair or pipe sections 1 and 2 forming a part of a high pressure conduit system are illustrated. Each pipe section is typically provided with flanged ends 3 and 4, the flanges having circumferentially spaced holes 5 through which bolts 6 may be passed and tightened to provide a pressure tight coupling when the joint is properly assembled with suitable gasketing.

According to the invention the condensate removal assembly comprises a plate 8 having a orifice 9 of small diameter relative to the inside diameter of the pipe in order to provide a substantial pressure drop in the steam line. Orifice plate 8 further includes a tab 10 which projects outwardly beyond the outer periphery of the flanges 3 and 4. Tab 10 has suitable identifying indicia inscribed on one of its surfaces, for instance the diameter of orifice 9, so that this information can be determined by engineering personnel without disassembling the joint. Mounted on the low pressure side of the orifice plate is a compressible gasket 11. Gasket 11 is preferably of known type comprising spiral wound alternate layers of asbestos and strip metal, as is well-known in the art. Typically the gasket 11 is mouted in a centering ring 12. The internal diameter of the gasket is slightly larger than the internal diameter of pipe section 2.

Figure 2:
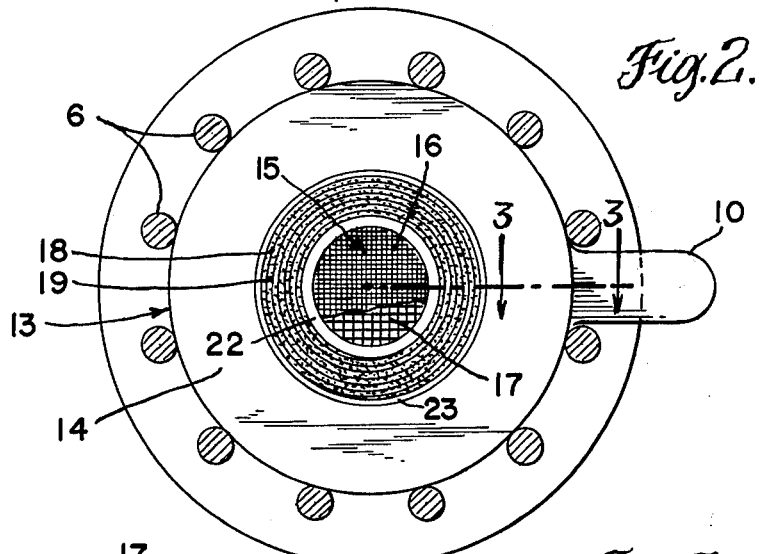
FIG. 2 is a face view of a gasket and screen assembly taken as indicated along line 2—2 in FIG. 1.

Mounted on the upstream or high pressure side of the orifice plate is a second gasket assembly 13 shown in face view in FIG. 2. Typically gasket assembly 13 includes a centering ring 14 in which is mounted the gasket material itself which comprises spiral wound layers of asbestor and strip metal material. The gasket element 13 has mounted within it a screen or filter means 15 for the purposes to be described hereinafter. Filter means 15 preferably comprises a pair of screen elements 16 and 17. Screen element 16 is preferably is a finely woven mesh screen having a multiplicity of openings sized to only admit particles which are small enough to pass through aperture 9 in aperture plate 8. Although other types of screen elements may be employed in place of the woven mesh type element shown, as for example a perforated plate type screen element, it is critical to the invention that the openings in the screening element are smaller than the orifice and it is also important that there be sufficient openings so that when some of the openings become clogged there will be a multiplicity of alternate flow paths to the orifice.

Figure 3:
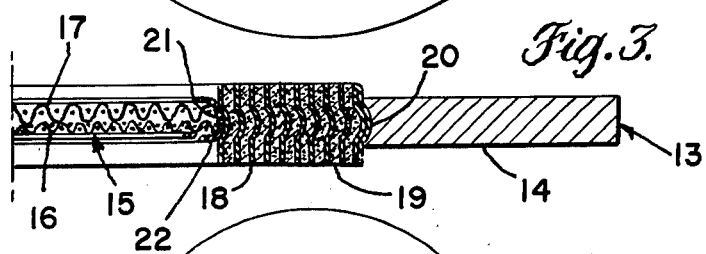
FIG. 3 is an enlarged half plan section taken one line 3—3 of FIG. 2.
Figure 4:
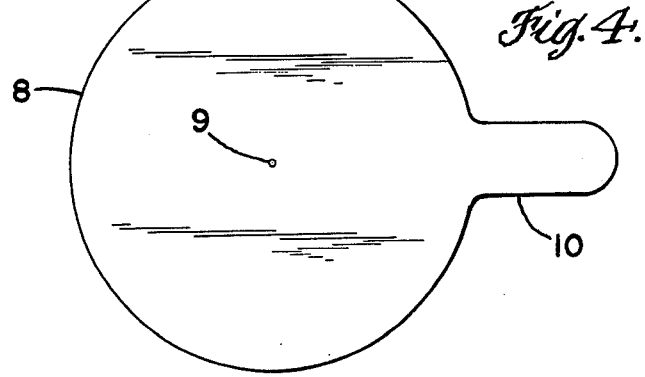
FIG. 4 is a face view of the orifice disk.

Although the design of the combined gasket and screen may vary somewhat, a preferred assembly is that shown in U.S. pat. No. 3,622,008 issued Nov. 23, 1971. The assembly shown in FIGS. 2 and 3 is in most respects identical to that assembly. As is indicated in that patent the gasket is formed of a metal strip and a strip formed of packing material such as asbestos. In FIGS.

3 and 4 herein the metal strip is indicated at 18 and the asbestos material by the reference character 19. The metal strip is bent as indicated in FIG. 3 with a groove running lengthwise thereof on one side and a corresponding bead or ridge on the other side. The strip of compressible material and the strip of asbestos material are wound together to form a gasket having in section alternate layers of asbestos and metal with a bead running about its outer periphery and a ridge exposed at its inner periphery as shown at 20 and 21 respectively in FIG. 3. Preferably the bead or ridge 20 fits within a groove in the centering ring 14. The construction of the first gasket is substantially identical to that described.

The screen or filter means 15 is mounted in a rim 22 which is adapted to be snapped into the inner groove 21 in the portion of the metal strip on the inner periphery of the gasket 13. As indicated in the above-identified patent, when the gasket assembly is compressed as the pipe joint is tightened, the gasket expands radially inwardly sufficient to tightly and to firmly hold the screen in place.

As indicated above and as shown in FIG. 1 the screen assembly is mounted on the upstream or high pressure side of orifice plate 8 with the small openings in the screen element 16 blocking the passage of particulates except those small enough to pass through the orifice plate. Screen element 17 is formed of relatively coarse wire with large openings as compared to those of element 16. It functions as a spacer means to hold screen element 16 in spaced relationship with respect to the orifice, thereby assuring that the maximum number of openings in screen 16 are available as flow passages for the mixture of gas and condensate in line 1.

In addition to droplets of water passing through the orifice 9 a certain amount of steam will be condensed due to the expansion effect present because of the pressure drop on the downstream side of the orifice plate. All of the water is conveyed away through line 2 for subsequent reuse.

The presence of the screen assembly in combination with the orifice plate is essential to the operation of the invention. The multiplicity of small openings in the screen element 16 assures the vaitability of a flow path for the condensate even when numerous openings become clogged with large particles of foreign matter. An important feature is the provision of the spacer screen element 17 which keeps the screen element 16 from being pressed against the face of the orifice plate. This arrangement further contributes to the availability of the maximum number of flow passages to the orifice plate.

We claim:

1. An assembly for removing condensate in high pressure steam lines and the like, comprising a plate adapted to be mounted in a line carrying steam or other vapor under pressure, said plate having a restrictive orifice therein, a first gasket in engagement with the downstream side of the plate providing a pressure seal, between the orifice plate and the downstream section of the line, a second gasket in engagement with the upstream side of the plate providing a pressure seal between the adjacent side of the orifice plate and the upstream section of the line, a screen element on the upstream side of the orifice carried by the second gasket and extending throughout the entire flow cross section of the line, said screen element having a multiplicity of openings of a size to admit only particles small enough to pass through the restrictive orifice and fluid pervious support means positioned between the screen element and the plate, and extending over and engaging portions of the screen element at a plurality of discrete locations for maintaining the screen element in spaced relation to the orifice plate even under conditions of high pressure.

2. Apparatus according to claim 1, wherein said screen element comprises a wire mesh screen.

3. Apparatus according to claim 2 wherein said support means comprises a mesh screen element having mesh openings which are relatively large as compared to the openings in the first named screen element.

4. Apparatus according to claim 3 wherein said second gasket comprises a spiral metal strip and a strip of compressible packing material interposed in the spiral convolutions, said gasket having a grooved inner periphery, and wherein said screen element and said spacer means are mounted in a peripheral rim adapted to fit within said grooved inner periphery.

5. An in-line assembly for the removal of condensate from high pressure steam lines and the like, said assembly being adapted to fit between a pair of pipe sections, and comprising a flat plate having an orifice for creating a pressure drop in the line, a spiral wound gasket of alternate layers of packing and metal strip in engagement with the low pressure side of the orifice plate providing a seal between the low pressure side of the orifice plate and the adjacent pipe section, a second spiral wound gasket of alternate layers of packing layers of packing and metal strip in engagement with the high pressure side of the orifice, said second gasket providing a seal between the high pressure side of the orifice plate and the adjacent pipe section, and a screen element carried by said second gasket, said screen element providing a multiplicity of flow passages to the orifice, said flow passages having a cross sectional area smaller than the cross sectional area of the orifice, and fluid pervious support means positioned between the screen element and the orifice plate and constructed and arranged to engage the screen element at a plurality of discrete locations to maintain the screen element and the orifice plate in space relation to allow the passage of fluid to the office.

6. In a high pressure steam conduit, an assembly comprising an orifice plate for producing a relatively large pressure drop in the conduit, first gasket means in engagement with the upstream side of the orifice plate for providing sealing between the orifice plate and the upstream side of the conduit, and second gasket means in engagement with the downstream side of the orifice plate for providing sealing between the orifice plate and the downstream side of the conduit, a screen in the conduit carried by the first gasket means on the upsteam side of the orifice providing a multiplicity of flow passages each having a cross section smaller than the orifice and a fluid pervious support element positioned between the screen and the orifice plate and including means extending over portions of the screen and engaging the screen at a plurality of discrete locations for maintaining the screen in spaced relationship to the orifice plate.

7. A method of maintaining a multiplicity of flow passages to a condensate draining orifice located in an orifice plate in a high pressure steam line or the like wherein a filter effective to arrest the travel of any particle too lare in size to pass through the orifice is placed closely adjacent the orifice on the upstream side of the orifice plate comprising mounting a fluid pervious support means between the orifice plate and the filter means, supporting the filter at a plurality of discrete locations spaced across the filter by engagement with the support means and maintaining the support means between the filter means and the orifice plate under conditions of high pressure in the line to provide a multiplicity of flow passages to the orifice by placing the filter means and support means in an internal peripherial groove of a spiral wound gasket and compressing the spiral wound gasket between the orifice plate and an upstream section of the line.

* * * * *